April 19, 1938.　　　F. W. KOPFLER　　　2,114,472
COMPARATOR
Filed Oct. 30, 1937　　　2 Sheets-Sheet 1
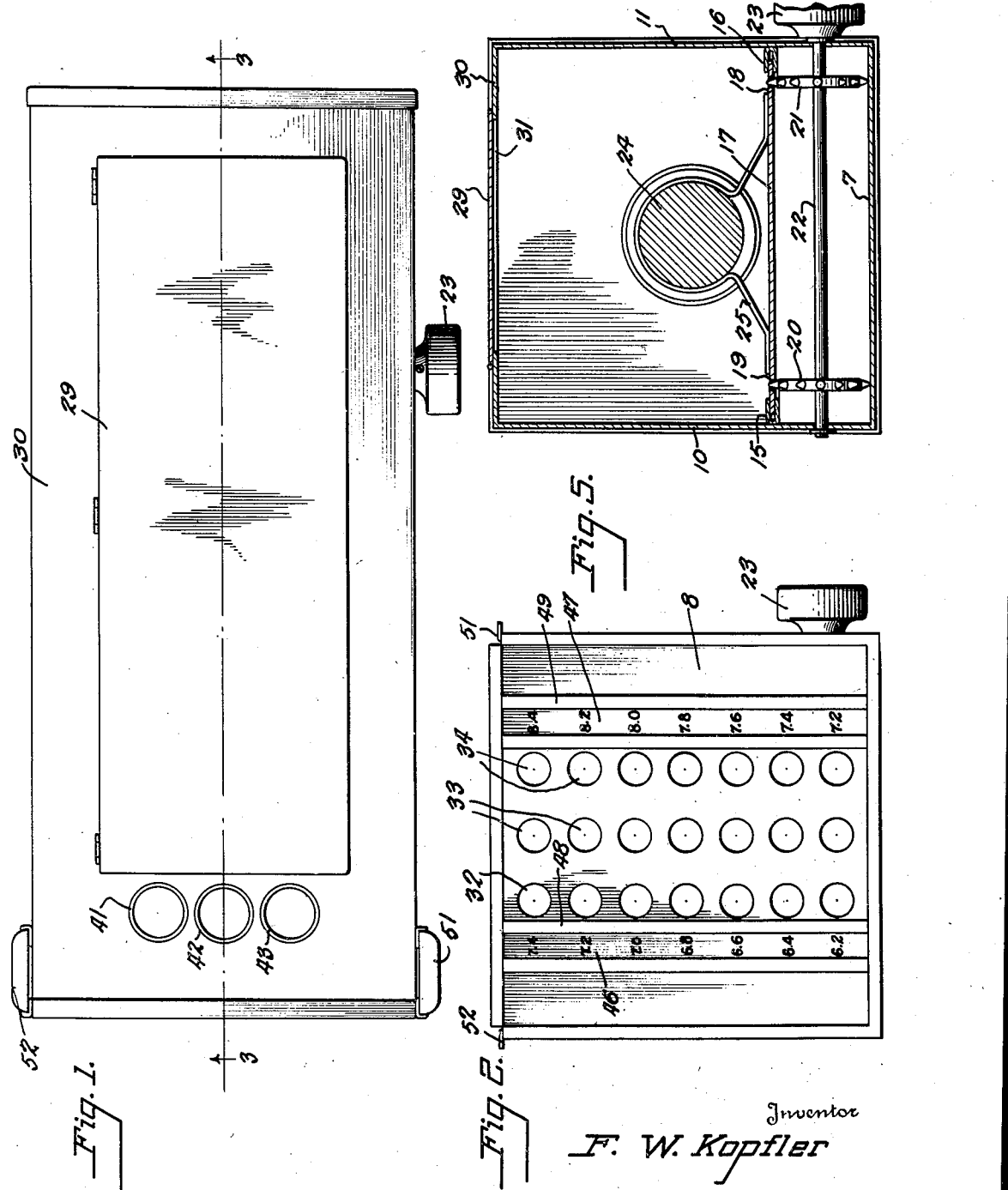
Inventor
F. W. Kopfler April 19, 1938. F. W. KOPFLER 2,114,472
COMPARATOR
Filed Oct. 30, 1937 2 Sheets-Sheet 2
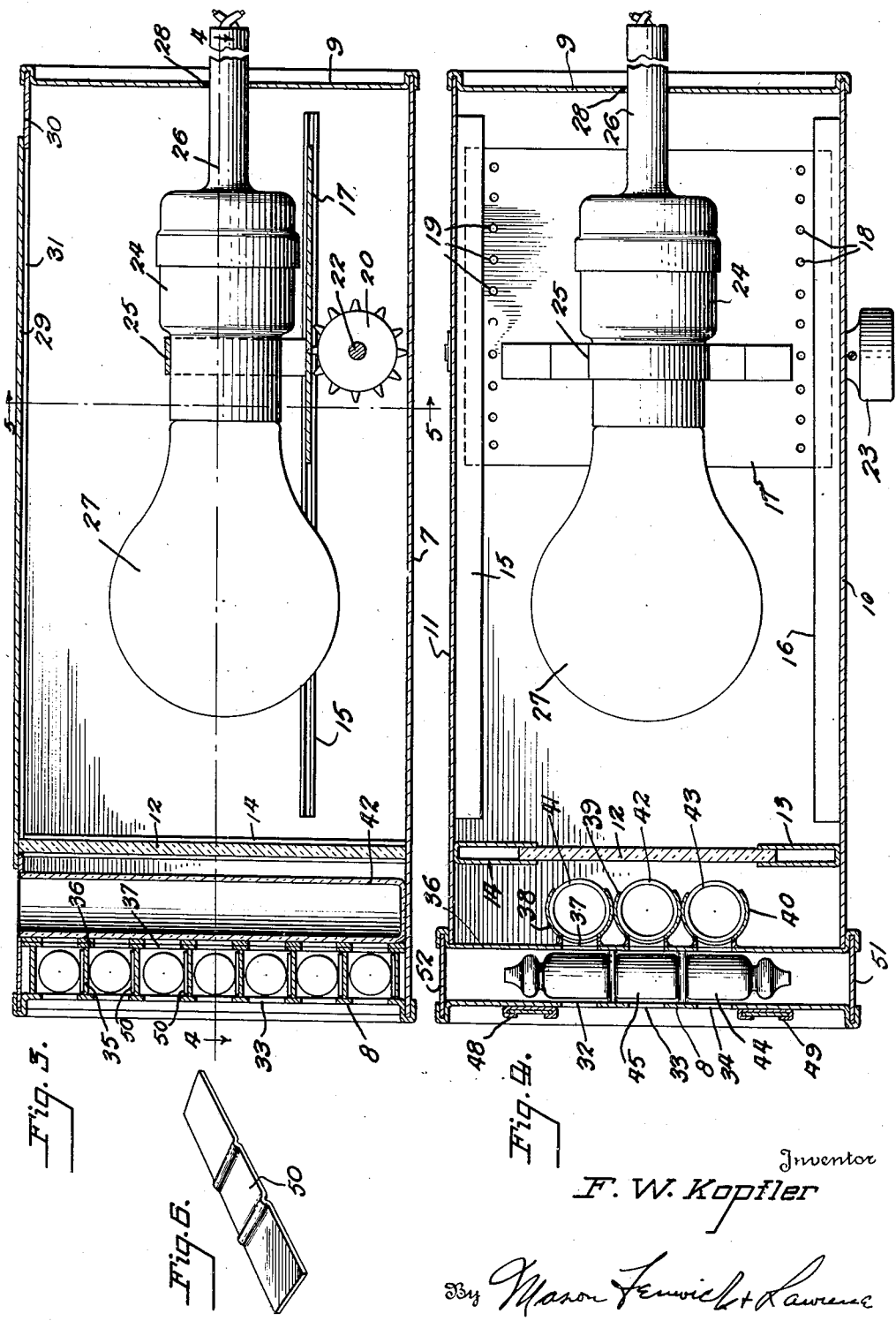
Inventor
F. W. Kopfler
By Mason Fenwick + Lawrence
Attorneys Patented Apr. 19, 1938

2,114,472

UNITED STATES PATENT OFFICE 2,114,472

COMPARATOR

Francis William Kopfler, New Orleans, La.

Application October 30, 1937, Serial No. 171,975

7 Claims. (Cl. 88—14)

This invention relates to comparators of the type used in determining certain qualities of liquids by color comparisons; and is particularly adapted for use in determining the degree of acidity or alkalinity in solutions by measuring the hydrogen-ion concentration thereof.

In apparatus of the character to which the present invention relates, this method of ascertaining the pH value of solutions is based on the fact that certain substances are indicative of the degree of acidity or alkalinity by changes in color of the solutions to which they are added.

In the present invention a series of solutions of the indicator of different color strengths are enclosed in ampoules and these colored ampoules are used as standards to form a vertical color scale arranged adjacent tubes adapted to contain the unknown solution, the degree of alkalinity or acidity of which is to be determined.

Apparatus involving movable color standards and heretofore used to facilitate color comparison require very careful attention on the part of the observer to ascertain the identity of the colors between the standards and the unknown solutions. It is therefore an object of the present invention to provide a comparator constructed with color standards arranged in a vertical scale against which tubes of unknown solution may be arranged and comparison effected by the observer glancing along the scale until he observes a standard exactly matching the color of the unknown solution.

Other objects of the invention will become apparent as the detailed description thereof proceeds.

In the drawings:

Figure 1 is a top plan view of the comparator;

Figure 2 is an end elevation;

Figure 3 is a vertical, longitudinal section of the comparator taken on the line 3—3 of Figure 1;

Figure 4 is a horizontal section taken on the line 4—4 of Figure 3;

Figure 5 is a vertical transverse section taken on the line 5—5 of Figure 3; and Figure 6 is a perspective view of a sliding tray used to position the standards properly in the comparator.

As shown in the drawings, the comparator comprises a casing constructed of any suitable opaque sheet material. The bottom 7 of the casing is suitably secured at its opposite ends to the front wall 8 and a rear wall 9, and to the side walls 10 and 11. The casing is divided by a partition 12 of opal glass slidably mounted between the channel members 13 and 14, suitably secured directly opposite to each other on the sides 10 and 11.

At one side of partition 12, the casing is provided with horizontal channel members 15 and 16 (see Fig. 5), suitably secured to the sides 10 and 11 and parallel to the base 7. A base plate 17 is mounted to slide lengthwise of the casing in the channel members 15 and 16; and is provided with series of apertures 18 and 19 adapted to receive the teeth of a pair of pinions 20 and 21, fixed to a shaft 22 rotatably mounted in the sides 10 and 11. A knob 23 is connected to the end of the shaft 22 where it projects through the side 11 to facilitate rotation of the shaft 22 with the consequent reciprocation of the base plate 17.

An electric light socket 24 is mounted on the base plate 17 by means of a strap 25 which encircles the socket 24 and has its opposite ends suitably secured to the base plate 17. A tube 26 is secured to and projects from one end of the socket to receive the wire for energizing a lamp 27 detachably secured in the usual manner in the socket 24. The end 9 is provided with an aperture 28 through which the tube 26 slides. It will be apparent that rotation of the knob 23 will effect movement of the light bulb 27 toward and from the opal glass partition 12 to vary the intensity of the light diffused through the partition into the chamber formed in the casing at the other side of said partition. A door 29 is hinged to the top 30 to close an aperture 31 which gives access to the large chamber in the casing containing the electric light bulb and mechanism for moving the same.

The front wall 8 of the casing is provided with three series of vertical apertures 32, 33 and 34. These apertures form seven horizontal rows communicating with seven horizontal chambers formed by a similar number of horizontal partitions 35 suitably secured at their opposite edges to the rear of the front wall 8 and to a partition 36 extending across the casing parallel to the front wall 8 and the opal glass partition 12. The partition 36 is also provided with a series of apertures 37 arranged directly in line with the apertures on the front wall 8.

The partition 36 has suitable secured thereto the cylindrical members 38, 39 and 30 for supporting the tubes 41, 42 and 43, respectively, adapted to contain the unknown solution, the colors of which are to be compared with the color standards visible through the apertures in the front face of the comparator. The color scale is formed by color standards inserted in the chambers formed by the partitions 35. Each standard is comprised of a small ampoule 44 containing the color solution. The ampoules are arranged in accordance with their color values opposite the two outer vertical rows of apertures in the front wall 8; and small tubes 45 filled with distilled water are arranged in the horizontal chambers opposite the central vertical row of apertures.

The pH value of each standard in the vertical rows of standards is indicated on the numerical scales 46 and 47 formed on strips of suitable material slidably mounted in the guide members 48 and 49, respectively, secured to the front end of the comparator. The ampoules 44 and the tubes 45 may be mounted on a small tray 50 to facilitate the insertion and removal of the standards and tubes in the various horizontal chambers formed by the horizontal partitions 35. The ends of these horizontal partitions are adapted to be closed by slides 51 and 52 mounted to slide in channel members suitably formed on the side walls 10 and 11, respectively.

As already indicated, the ampoules forming the color standards are inserted in the horizontal chambers before the outer vertical rows of apertures in the front wall 8; and the tubes containing water are arranged in the same chambers between the outer rows of ampoules in the rear of the central vertical row of apertures. The two outer vertical comparison tubes are intended to contain the unknowns without dye. The central vertical comparison tube contains the unknowns with dye and will be located behind the central vertical row of small tubes containing water.

While I have disclosed the comparator as adapted for the use of liquid standards, the invention is not to be considered as limited to the use of such standards, since it is contemplated that solid glass or other solid standards may be substituted for the liquid standards. However, it is preferable to use liquid standards since they give a better result by the use of the light transmitted through the unknown solutions in the vertical tubes. When the light is turned on for comparison, a flat surface is presented when the unknowns are viewed through this standard. This makes the comparison easier and more accurate. The arrangement of the standards in vertical rows eliminates the use of movable parts and facilitates comparison because the colors can be very easily matched by glancing along the rows to be compared. The adjustment of the light bulb facilitates comparison because the light can be moved forward when a dark solution is to be tested; and backward to the most advantageous point during the testing of a light solution.

While the preferred form of the invention has been herein shown and described, it is to be understood that various changes may be made in the details of construction and in the combination and arrangement of the parts, within the scope of the claims, without departing from the spirit of this invention.

What I claim is:

1. A comparator comprising a casing of light excluding material and having a wall thereof provided with two vertical rows of apertures, a partition parallel to said wall and provided with apertures corresponding in number and coaxial with those in said wall, horizontal shelves connecting said wall and partition between the apertures in said vertical rows and forming horizontal chambers adapted to support color standards between coaxial apertures, color standards on said shelves located between coaxial apertures in one of said vertical rows in said wall and partition, colorless standards positioned between the apertures of the vertical row adjacent the first named row, means on the side of said partition opposite said chambers for holding tubes containing unknowns in vertical position along said rows of apertures in said partition, and means for projecting rays of light through said vertical tubes and standards, and a numerical scale adjacent the row of color standards to indicate the value of each standard.

2. A comparator comprising a casing of light excluding material and having a wall thereof provided with three vertical rows of apertures, a partition parallel to said wall and provided with apertures corresponding in number and coaxial with those in said wall, horizontal shelves connecting said wall and partition between the apertures in said rows and forming horizontal chambers adapted to support color standards between coaxial apertures, color standards on said shelves located between the coaxial apertures in the two outer vertical rows in said wall and partition, colorless standards positioned between the apertures in the center vertical row, means on the side of said partition opposite said chambers for holding tubes containing unknowns in vertical position along said rows of apertures, a light bulb slidable in said casing toward and from said partition, means for reciprocating said light bulb in said casing, and numerical scales on said wall adjacent to the outer vertical rows of apertures to indicate the values of the color standards in said outer vertical row.

3. The comparator set forth in claim 1 in which said color standards comprise transparent containers filled with liquid dyed to correspond with the numerical value on the scale adjacent thereto.

4. The comparator set forth in claim 2 in which the color standards in each of the outer rows comprise transparent containers filled with dyed liquid corresponding with the numerical value of the scale adjacent thereto.

5. The comparator set forth in claim 2 in which the colorless standards comprise transparent containers filled with water, and in which the color standards of the two outer rows comprise transparent containers filled with liquid dyed to correspond with the numerical values of the scales adjacent thereto.

6. The combination of the comparator set forth in claim 1 with a light diffusing partition interposed between said lighting means and the first named partition.

7. The combination of the comparator set forth in claim 2 with a light diffusing partition interposed between said lighting means and the first named partition.

FRANCIS WILLIAM KOPFLER.